United States Patent [19]

Cherry

[11] Patent Number: 5,367,813
[45] Date of Patent: Nov. 29, 1994

[54] DECOY ANCHOR AND WINDING MECHANISM

[76] Inventor: Edward K. Cherry, 70 Wellington Dr., Jackson, Tenn. 38305

[21] Appl. No.: 120,952

[22] Filed: Sep. 15, 1993

[51] Int. Cl.⁵ ............................................. A01M 31/06
[52] U.S. Cl. ................................................ 43/2; 43/3
[58] Field of Search ...................... 43/3, 2; 242/107.6, 242/107.7

[56] References Cited

U.S. PATENT DOCUMENTS

| | | | |
|---|---|---|---|
| 410,523 | 9/1889 | Jencks | 43/3 |
| 807,965 | 12/1905 | Rice | 422/107.6 |
| 811,036 | 1/1906 | Cram | 43/3 |
| 1,789,649 | 1/1931 | Gazecki | 43/3 |
| 2,539,727 | 1/1951 | Clark | 43/3 |
| 2,608,361 | 8/1952 | Huebner | 43/3 |
| 4,635,391 | 1/1987 | Early | 43/26.1 |
| 4,674,219 | 6/1987 | Chargo | 43/3 |

FOREIGN PATENT DOCUMENTS

| | | | |
|---|---|---|---|
| 0033220 | 3/1977 | Japan | 242/107.6 |
| 0127237 | 10/1980 | Japan | 242/107.6 |

*Primary Examiner*—P. Austin Bradley
*Assistant Examiner*—James Miner
*Attorney, Agent, or Firm*—Hugh E. Smith

[57] ABSTRACT

A decoy assembly having a winding mechanism and an anchor. The assembly comprises a decoy element having forward, rear, upper, and lower portions. A recess is formed within the lower portion. A keel element has a forward, rearward, upper and lower portions. An opening is formed between the lower and upper portions of the keel element. A nonrotatable axle is positioned across the opening intermediate the forward and rearward portions of the keel. The upper portion of the keel element is operatively coupled with the lower portion element with the opening and recess in alignment. A spool assembly has an inner radial portion fixed against rotation with respect to the nonrotatable axle. An outer radial portion is rotatable with respect to the inner radial portion. A spring has a fixed end secured to the inner radial portion of the spool assembly, and a movable end secured to the outer radial portion of the spool. A line has a fixed end secured to the outer radial portion of the spool assembly and a free end adapted to be pulled to rotate the outer radial portion of the spool assembly with respect to the inner radial portion, and thereby coil the spring.

1 Claim, 4 Drawing Sheets

DECOY ANCHOR AND WINDING MECHANISM

BACKGROUND OF THE INVENTION

1. Field of the Invention

The present invention relates to a decoy anchor and winding mechanism and more particularly pertains to a decoy having a winding mechanism and an anchor with a automatically retractable line therebetween.

2. Description of the Prior Art

The use of decoys is known in the prior art. More specifically, decoys which employ keel portions are known to consist basically of familiar, expected and obvious structural configurations, notwithstanding the myriad of designs encompassed by the crowded prior art which have been developed for the fulfillment of countless objectives and requirements.

For example, U.S. Pat. No. 4,120,110 discloses a decoy assembly which includes a plurality of decoy members of a generally flat configuration.

Furthermore, the following design patents illustrate the state of the art in duck decoys:

U.S. Pat. No. D. 268,863 discloses a duck decoy with stabilizing elements.

U.S. Pat. No. D. 268,047 discloses a duck decoy with stabilizing sponsors and keel.

U.S. Pat. No. D. 270,656 discloses a duck decoy stabilizer for use in stormy weather.

U.S. Pat. No. D. 268,862 discloses a combined duck decoy and stabilizers.

While these decoys fulfill their respective, particular objectives and requirements, the aforementioned patents do not describe a decoy assembly with a winding mechanism. Furthermore, the prior art decoys do not illustrate a decoy assembly with a winding mechanism for an anchor.

In this respect, the decoy assembly according to the present invention substantially departs from the conventional concepts and designs of the prior art, and in so doing provides an apparatus that is a decoy and an anchor winding mechanism.

Therefore, it can be appreciated that there exists a continuing need for new and improved decoy assemblies which can be automatically anchored and unanchored. In this regard, the present invention substantially fulfills this need.

SUMMARY OF THE INVENTION

In view of the foregoing disadvantages inherent in the known types of decoys now present in the prior art, the present invention provides an improved decoy anchor and winding mechanism. As such, the general purpose of the present invention, which will be described subsequently in greater detail, is to provide a new and improved decoy anchor and winding mechanism apparatus and method which has all the advantages of the prior art decoys and none of the disadvantages.

To attain the advantages of the present invention, the present invention essentially comprises a decoy assembly having a winding mechanism and an anchor, the decoy assembly comprising a decoy element having a forward portion, a rearward portion, an upper portion and a lower portion with a recess formed within the lower portion of the decoy element; a keel element having a forward portion, a rearward portion, an upper portion, and a lower portion with an opening formed between the lower and upper portions of the keel element, a nonrotatable axle positioned across the opening intermediate the forward and rearward portions of the keel, the upper portion of the keel element operatively coupled with the lower portion of the decoy element with the opening and recess in alignment; a spool assembly having an inner radial portion fixed against rotation with respect to the nonrotatable axle, and a outer radial portion rotatable with respect to the inner radial portion, the spool assembly having an outer radial surface with external flanges bounding the outer radial surface; a spring of stainless steel having a fixed end secured to the inner radial portion of the spool assembly and a movable end secured to the outer radial portion of the spool assembly; a line having a fixed end secured between the external flanges of the outer radial portion and a free end adapted to be pulled to rotate the outer radial portion of the spool assembly with respect to the inner radial portion, and thereby coil the spring; a locking assembly having a plurality of holes formed through the outer radial portion of the spool assembly, a spool lock having a fixed end secured to the nonrotatable axle and a free end with a stopper, the stopper adapted to be selectively positionable in a locking orientation in one of the holes, and in an unlocking orientation out of the holes wherein the spring will rotate the outer radial portion to wind up the line.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved decoy which has all the advantages of the prior art decoys and none of the disadvantages.

It is another object of the present invention to provide a new and improved decoy anchor and winding mechanism which may be easily and efficiently manufactured and marketed.

It is a further object of the present invention to provide a new and improved decoy anchor and winding mechanism which is of a durable and reliable construction.

An even further object of the present invention is to provide a new and improved decoy anchor and winding mechanism which is susceptible of a low cost of manufacture with regard to both materials and labor, and which accordingly is then susceptible of low prices of sale to the consuming public, thereby making such decoy anchor and winding mechanism economically available to the buying public.

Still yet another object of the present invention is to provide a new and improved decoy anchor and winding mechanism which provides in the apparatuses and methods of the prior art some of the advantages thereof, while simultaneously overcoming some of the disadvantages normally associated therewith.

Still another object of the present invention is to anchor hunting decoys.

Yet another object of the present invention is to automatically wind up an anchor od a decoy.

Even still another object of the present invention is to simplify a hunter's tasks.

Lastly, it is an object of the inventor to provide a decoy assembly having a winding mechanism and an anchor, the decoy assembly comprising a decoy element having a forward portion, a rearward portion, an upper portion and a lower portion with a recess formed within the lower portion of the decoy element; a keel element having a forward portion, a rearward portion, an upper portion, and a lower portion with an opening formed between the lower and upper portions of the keel element, a nonrotatable axle positioned across the opening intermediate the forward and rearward portions of the keel, the upper portion of the keel element operatively coupled with the lower portion of the decoy element with the opening and recess in alignment; a spool assembly having an inner radial portion fixed against rotation with respect to the nonrotatable axle, and a outer radial portion rotatable with respect to the inner radial portion; a spring having a fixed end secured to the inner radial portion of the spool assembly, and a movable end secured to the outer radial portion of the spool assembly; a line having a fixed end secured to the outer radial portion of the spool assembly and a free end adapted to be pulled to rotate the outer radial portion of the spool assembly with respect to the inner radial portion, and thereby coil the spring. A decoy assembly having a winding mechanism and an anchor, the decoy assembly comprising: a decoy element having a forward portion, a rearward portion, an upper portion and a lower portion with a recess formed within the lower portion of the decoy element; a keel element having a forward portion, a rearward portion, an upper portion, and a lower portion with an opening formed between the lower and upper portions of the keel element, a nonrotatable axle positioned across the opening intermediate the forward and rearward portions of the keel, the upper portion of the keel element operatively coupled with the lower portion of the decoy element with the opening and recess in alignment; a spool assembly having an inner radial portion fixed against rotation with respect to the nonrotatable axle, and a outer radial portion rotatable with respect to the inner radial portion, a spring having a fixed end secured to the inner radial portion of the spool assembly, and a movable end secured to the outer radial portion of the spool assembly; a line having a fixed end secured to the outer radial portion of the spool assembly and a free end adapted to be pulled to rotate the outer radial portion of the spool assembly with respect to the inner radial portion, and thereby coil the spring.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
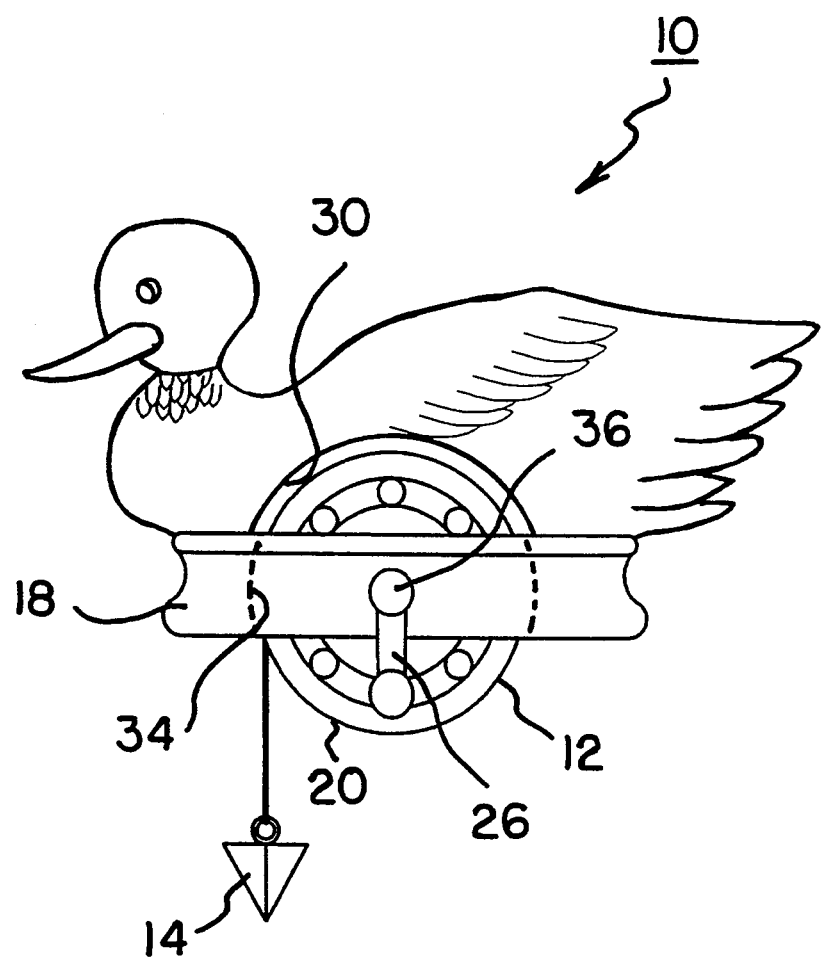
FIG. 1 is a plain view of a decoy anchor and winding mechanism fabricated in accordance with the principles of the present invention.
Figure 2:
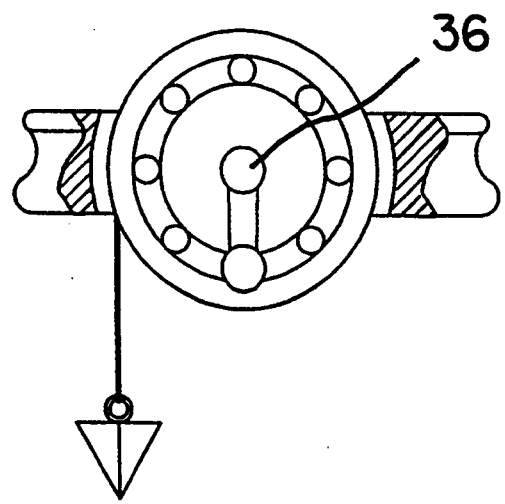
FIG. 2 is an enlarged view of the spool assembly employed in the device of FIG. 1.
Figure 3:
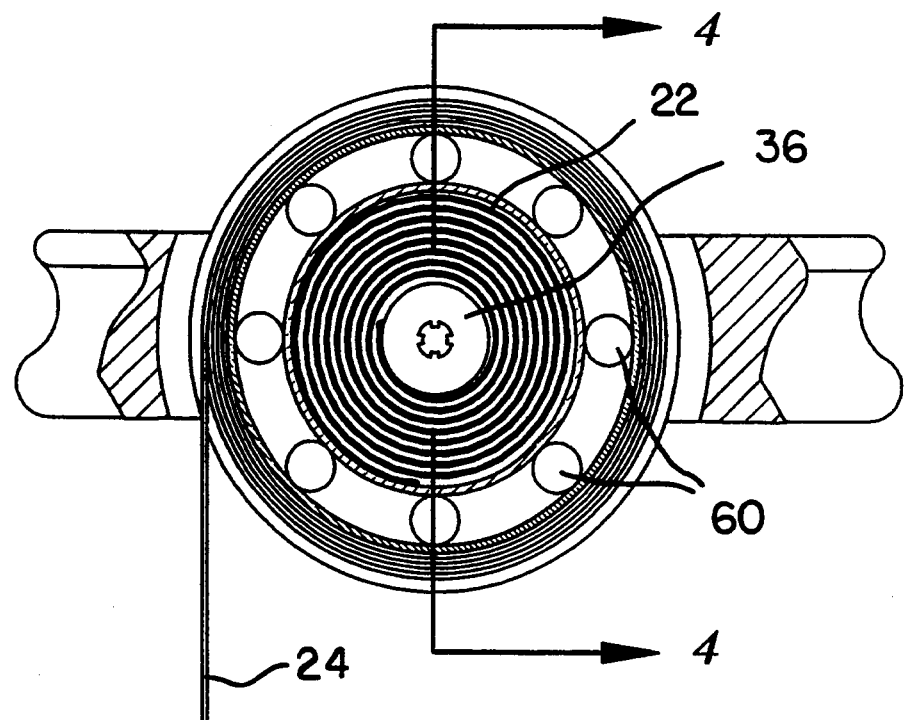
FIG. 3 is a further enlarged view of the spool assembly FIG. 2 but with additional parts removed to show certain internal constructions.
Figure 4:
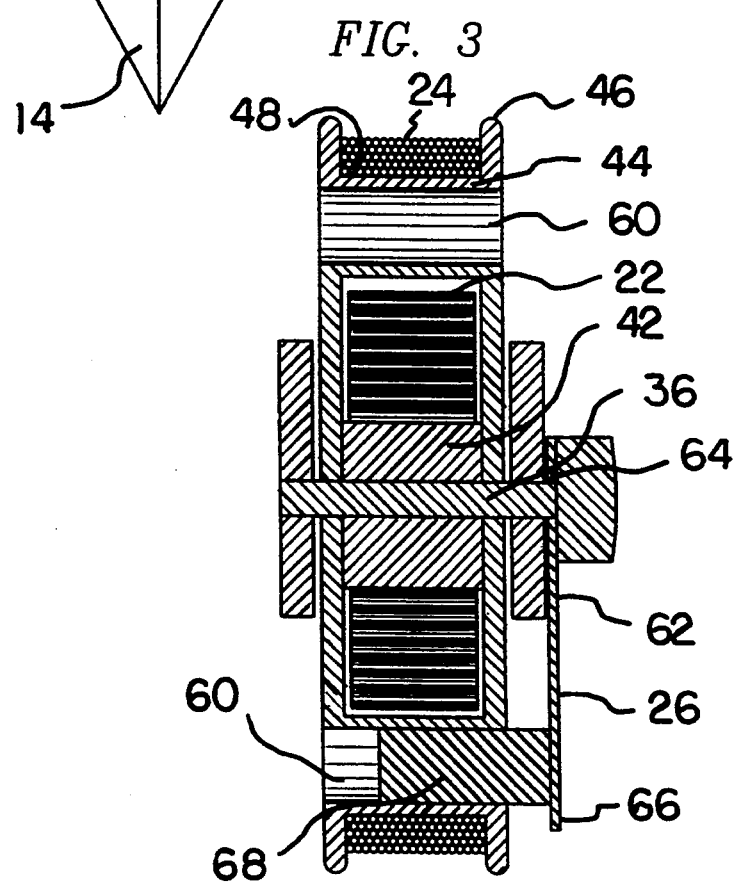
FIG. 4 is a sectional view of the spool of FIG. 3 taken along line 4—4 of FIG. 3.
Figure 5:
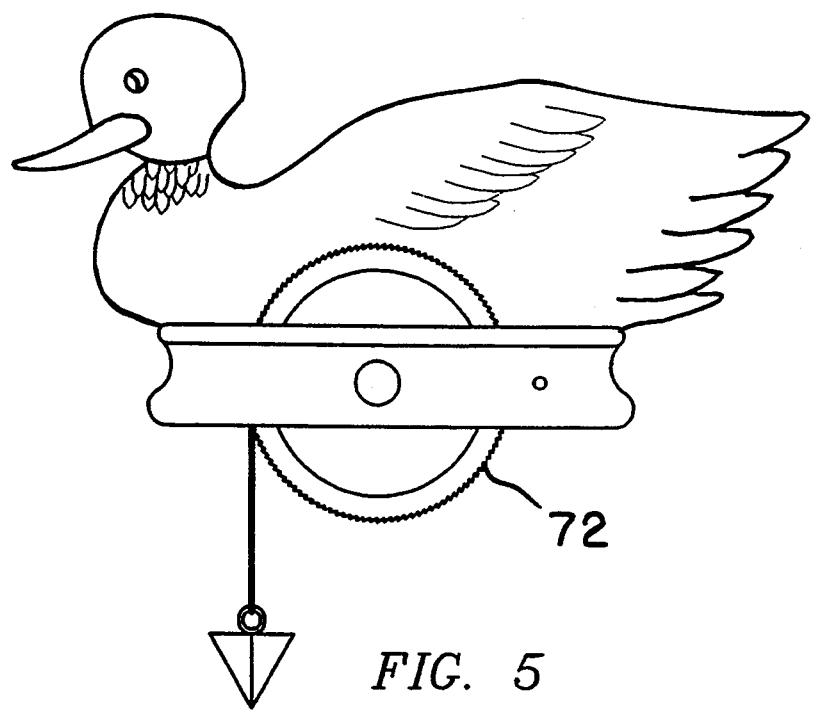
FIG. 5 is a plan view similar to FIG. 1 but illustrating an alternate embodiment of the invention.
Figure 6:
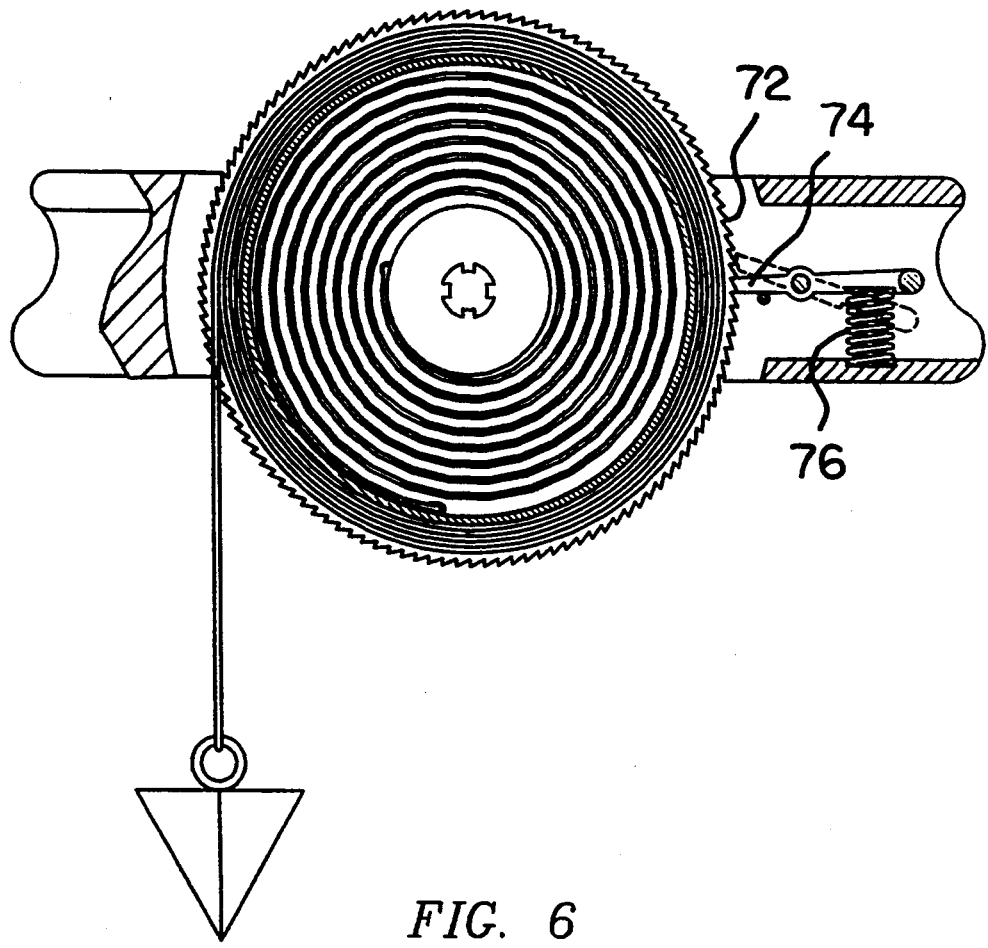
FIG. 6 is an enlarged sectional showing of the spool assembly of FIG. 5.
Figure 7:
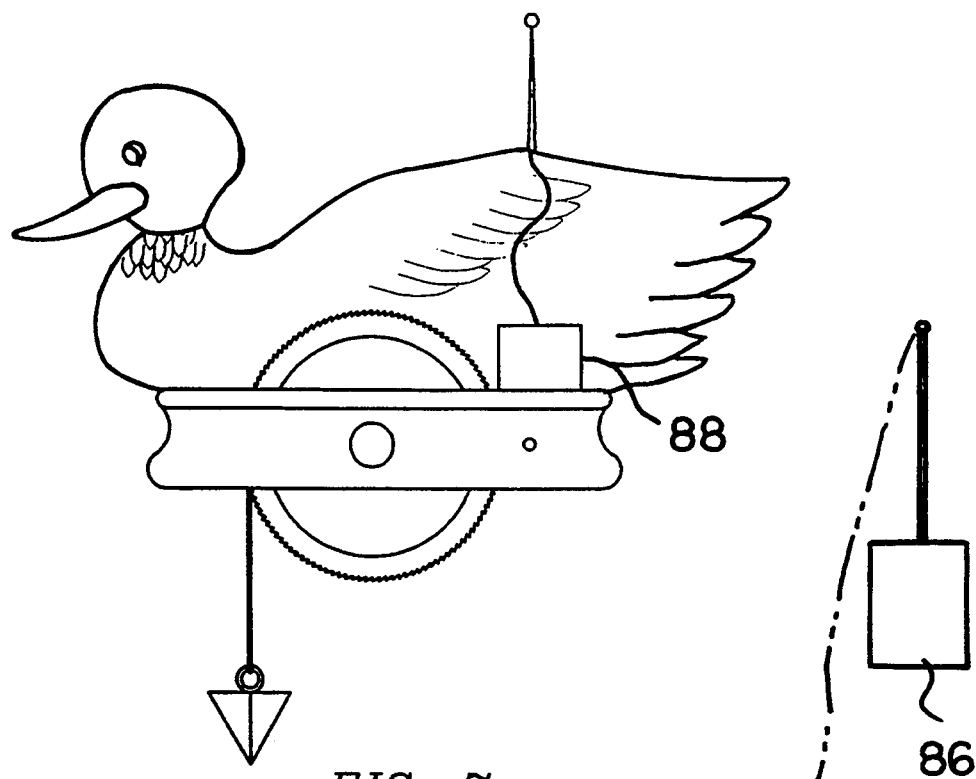
FIG. 7 is a plan view similar to FIGS. 1 and 5 but illustrating an additional alternate embodiment of the invention.
Figure 8:
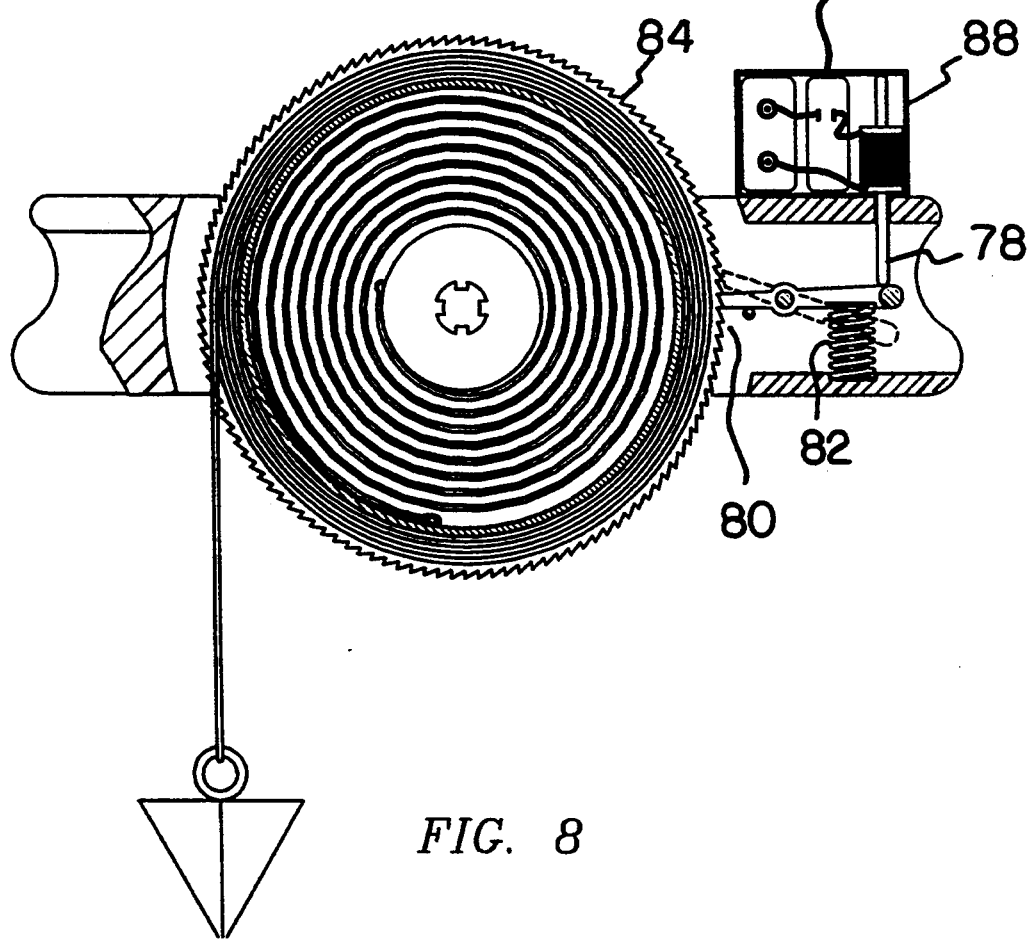
FIG. 8 is an enlarged sectional showing of the spool assembly of FIG. 7.

With reference now to the drawings, and in particular to FIG. 1 thereof, a new and improved decoy assembly embodying the principles and concepts of the present invention and generally designated by the reference numeral 10 will be described.

The present invention relates to a decoy assembly 10 which includes a winding mechanism 12 and an anchor 14. The decoy assembly 10 is made up of the following elements: a decoy 10, a keel 18, a spool 20, a spring 22, a length of line 24, and a locking assembly 26. All of the elements cooperate to form a decoy assembly 10 that includes a winding mechanism 12 for a variable length anchor 14.

The decoy element 10 includes a forward portion, a rearward portion, an upper portion and a lower portion. The decoy element also includes a recess 30 formed within its lower portion.

Integral with the decoy element 10 is the keel element 18. The keel element includes a forward portion, a rearward portion, an upper portion, and a lower portion. The lower portion of the decoy element is integral with the upper portion of the keel element. The keel element includes an opening 34 extending between its lower and upper portions. A nonrotateable axle 36 is positioned across the opening 34 intermediate the forward and rearward portions of the keel. The opening 34 and recess 30 are in alignment for the rotatable receipt of a spool fixedly mounted on the axle.

The spool assembly 20 includes an inner radial portion 42 and an outer radial portion 44. The inner radial portion 42 is fixed against rotation with respect to the nonrotatable axle 36. The outer radial portion 44 is rotatable with respect to the inner radial portion mounting therebetween being at their peripheries. Furthermore, the spool assembly 20 includes external flanges 46 about its outer radial surface 48.

The inner and outer radial portions 42 and 44 are operatively coupled by way of a spring 22. The spring which is formed as a strip of stainless steel has a fixed end secured to the inner radial portion and a movable end secured to the outer radial portion for coiling tightly as the outer radial portion rotates under a force but uncoils when the force is relieved to return the spring and outer radial portion to a relaxed initial orientation.

The fixed end of a length of line 24 is secured between the external flanges 46 of the outer radial surface 48. The free end of the line is adapted to be pulled to rotate the outer radial portion of the spool assembly with respect to the inner radial portion, and thereby coil the spring.

A weight functioning as an anchor 14 is coupled to the free end of the line for retaining the decoy assembly 10 fixed in the water when the line is extended. The locking assembly 26 is employed to lock the outer radial portion of the spool assembly against rotation. The locking assembly includes a plurality of holes 60 formed through the outer radial portion of the spool assembly. The locking assembly further includes a spool lock 62 having a fixed end 64 secured to the nonrotatable axle and a free end 66 with a stopper 68. The stopper is adapted to be selectively positionable in a locking orientation in one of the holes. Conversely the stopper is positionable in an unlocking orientation out of the holes, wherein the spring will rotate the outer radial portion to wind up the line.

In operation, the decoy assembly 10 is taken out to the body of water where it is to be deployed. There the depth of the body of water is estimated with the stopper positioned in the unlocked orientation, a length of line is dispensed from the outer radial portion of the spool assembly. The length of line dispensed should be in accordance with the estimated depth of the body of water. Once a proper length of line is dispensed, the stopper is placed in the locking orientation in order to prevent the winding up of the line about the outer radial portion. A weight or an anchor can be disposed at the free end of the line in order to facilitate the anchoring of the decoy assembly. The decoy can then be deployed onto the water when retrieving the decoy, the decoy is taken and the stopper is removed from its locking position. The energy of the spring then serves to rotate the outer radial portion from the deployed orientation, and thus, wind the line about the outer radial portion to the relaxed or storage orientation.

The second embodiment of the invention employs a different locking assembly. In the locking assembly of the second embodiment, the outer radial portion of the spool assembly includes a set of gear teeth 72 about its periphery. The locking assembly further includes a springs biased spool lock 74 which is pivotally positioned within the keel assembly. Coil spring 76 effects the biasing. The spool lock is positionable in one or two orientations. In the first orientation, the spool lock engages the gear teeth and permits only the dispensing of the line from the outer radial portion. In the second orientation, the lock is disengaged from the gear teeth and the outer radial portion of the spool is free to wind up the line under the energy of the spring.

The third embodiment of the invention incorporates a solenoid actuated push rod 78 that cooperates with the pivoted spring biased spool lock 80 biased by spring 82. The push rod is adapted for movement between two positions. In the first position, the push rod engages the pivoted spring biased spool lock 80 and the spool lock is disengaged from the gear teeth 84. In the second position, the push rod is disengaged from the pivoted spring biased spool lock and the spool lock is engaged with the gear teeth 84. Furthermore, the movement of the solenoid actuated push rod can be controlled remotely from a radio transmitter 86 to receiver 88.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A decoy assembly having a winding mechanism and an anchor, the decoy assembly comprising:

a decoy element having a forward portion, a rearward portion, an upper portion and a lower portion with a recess formed within the lower portion of the decoy element;

a keel element having a forward portion, a rearward portion, an upper portion, and a lower portion with an opening formed between the lower and upper portions of the keel element, a nonrotatable axle positioned across the opening intermediate the forward and rearward portions of the keel, the upper portion of the keel element operatively coupled with the lower portion of the decoy element with the opening and recess in alignment;

a spool assembly having an inner radial portion fixed against rotation with respect to the nonrotatable axle, and a outer radial portion rotatable with respect to the inner radial portion, the spool assembly having an outer radial surface with external flanges bounding the outer radial surface, the central extent of the spool assembly being located within the opening of the keel, the lower extent of the spool assembly being located beneath the keel, and the upper extent of the spool assembly being located above the keel within the recess of the decoy element;

a spring of stainless steel having a fixed end secured to the inner radial portion of the spool assembly and a movable end secured to the outer radial portion of the spool assembly;

a line having a fixed end secured between the external flanges of the outer radial portion of the spool assembly and a free end adapted to be pulled to rotate the outer radial portion of the spool assembly with respect to the inner radial portion of the spool assembly, and thereby coil the spring; and a locking assembly having a plurality of holes formed through the outer radial portion of the spool assembly, a spool lock having a fixed end secured to the keel by the nonrotatable axle and having a free end with a stopper, the stopper adapted to be selectively positionable in a locking orientation in one of the holes, and in an unlocking orientation out of the holes wherein the spring will rotate the outer radial portion to wind up the line.

* * * * *